W. C. STRICKLER.

OIL-TANK

No. 6,736. Reissued Nov. 9, 1875.

Witnesses:
L. A. Bunting.
Heinrich F. Bruns.

Inventor:
Walter C. Strickler
by Lewis L. Coburn
Atty.

N. PETERS, PHOTO-LITHOGRAPHER, WASHINGTON, D. C.

222 DISPENSING.

Search Room

113

BEST AVAILABLE COPY

UNITED STATES PATENT OFFICE.

WALTER C. STRICKLER, OF CHICAGO, ILLINOIS, ASSIGNOR TO JOHN G. EVENDEN AND F. CORTEZ WILSON.

IMPROVEMENT IN OIL-TANKS.

Specification forming part of Letters Patent No. 130,762, dated August 20, 1872; reissue No. 6,736, dated November 9, 1875; application filed August 25, 1875.

*To all whom it may concern:*

Be it known that I, WALTER C. STRICKLER, of Chicago, county of Cook and State of Illinois, have invented an Improved Oil-Tank, of which the following is a specification, reference being had to the accompanying drawings, which form a part hereof.

My invention relates to that class of oil-tanks which are provided with a chamber, in which are placed the ordinary apparatus for drawing and measuring the oil.

My invention consists in the combination of an oil-tank and stationary hood, which is permanently attached to the oil-tank, and projects over it, forming a chamber on the top of the oil-tank; and also of the fixed hood extending over the top of the tank, leaving an opening on one side to admit of access to this chamber, and a sliding door or cover, which slides past the hood to open the chamber; and it also consists of the combination of the oil-tank A, the hood O, and diaphragm B, forming the bottom of the chamber and the top of the oil-tank.

Oil-tanks of this class have been made with a dome or top, hinged to the top of the tank. They are used by swinging the tops back upon their hinges, which necessitates raising the whole top of the chamber, and the bottom of the chamber has consisted of removable pans. I overcome serious objections, and provide several conveniences, by making this fixed hood, which extends over a large portion of the top of the tank, leaving on one side an opening, which serves as a place of access to the chamber. This opening is covered by a suitable door or cover, which is removed when access to the chamber is desired. The most convenient door or cover to this opening of the fixed hood is a sliding cover, which slides past the fixed hood. I have a permanent fixed plate, which constitutes the bottom of the chamber, and the top of the oil-tank.

Figure 1:
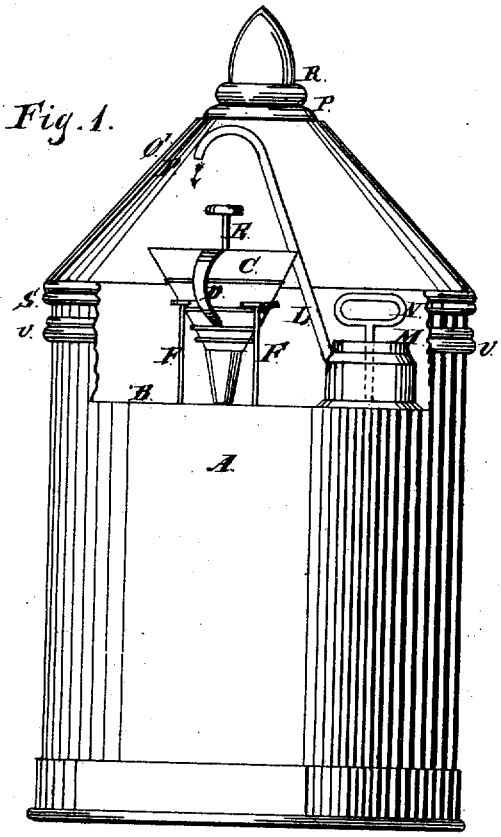
Figure 2:
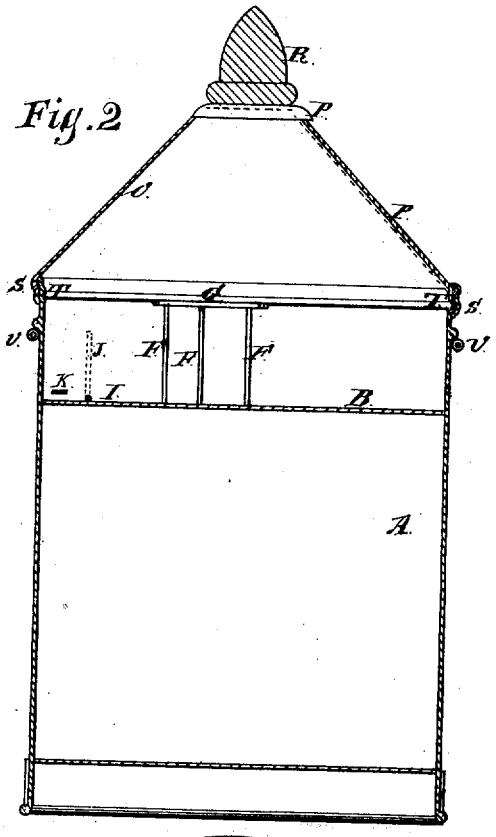
Figure 3:
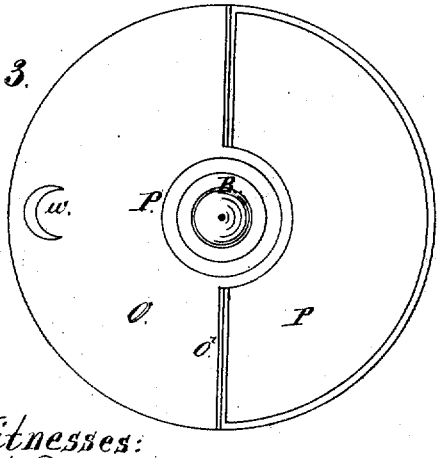
Figure 4:
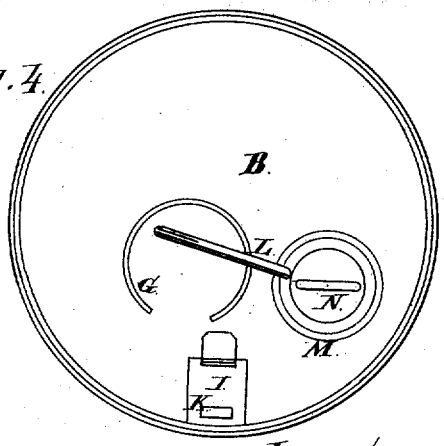

In the accompanying drawings, Figure 1 represents the side elevation of my oil-tank, showing the lower part of the chamber cut away, and the fixed hood open in front. Fig. 2 shows a vertical central section of the tank; Fig. 3, a top view of the tank, and Fig. 4 a top view of the tank with the top of the chamber removed.

A represents the body of tank, which holds the oil. B represents the bottom of the chamber, and it is also the head or top of the oil-tank. It just fills the wall of the oil-tank A, and is soldered therein. P is a fixed hood, firmly secured to the top of the oil-tank A, and extends over it, forming a large portion of the chamber in which the pump and measing-vessels are kept.

It will be observed that this fixed hood or top, with an opening on one side, enables me to utilize all the space on the top of the tank for a chamber, and at the same time require little or no additional room not occupied by the hood to obtain access to the chamber, and use the implements therein stored.

O is a sliding door, which, when drawn around in front of the hood, closes the chamber, and excludes therefrom all dust and insects. It is made of suitable shape to conform, substantially, to the shape or form of the fixed hood, so that it will slide past the fixed hood to open the chamber. Suitable guides are also provided to keep the cover or door O in place. The rim S is provided with a groove, which fits into a head or projection, T, on the body of the tank shown in Fig. 2.

This mechanism serves as the guide to keep the door or cover in place. When the oil is drawn from the tank it is liable to drip upon the bottom of the chamber B, which is made inclined in order that the drippings will run back into the tank through an opening, I.

The combination of the pump, measuring-funnel, and its rack and other special mechanisms connected therewith is shown in the accompanying drawings.

M N represent the pump; F G, the funnel-rack; C, the measuring-funnel; E the valves and rod of the funnel.

I claim—

1. The combination of an oil-tank, A, and a hood, P, rigidly attached thereto, the latter projecting above and partly extending over the top of the tank, so as to form a chamber thereon, substantially as and for the purposes set forth.

2. The combination, substantially as described, of an oil-tank, A, fixed or stationary hood P, and movable piece or door O, for the purposes set forth.

3. The combination of an oil-tank, A, the fixed hood P, extending over the top of the oil-tank to form a chamber thereon, and a sliding door or cover, O, which slides past the hood to open the chamber, as specified and shown.

WALTER C. STRICKLER.

Witnesses:
PAUL P. J. DONVAN,
JOHN P. PINNA.